United States Patent
Goncalves et al.

(10) Patent No.: US 12,513,359 B2
(45) Date of Patent: Dec. 30, 2025

(54) BROADBAND DIGITAL ACCESS (BDA) ARCHITECTURE FOR EXTENDING DIGITAL BROADBAND COMMUNICATIONS IN AN HFC NETWORK

(71) Applicant: Applied Optoelectronics, Inc., Sugar Land, TX (US)

(72) Inventors: George Goncalves, Cumming, GA (US); Rafael Celedon, Atlanta, GA (US); Mark Siejka, Winder, GA (US)

(73) Assignee: Applied Optoelectronics, Inc., Needham, MA (US)

( * ) Notice: Subject to any disclaimer, the term of this patent is extended or adjusted under 35 U.S.C. 154(b) by 578 days.

(21) Appl. No.: 17/962,129

(22) Filed: Oct. 7, 2022

(65) Prior Publication Data

US 2023/0118298 A1 Apr. 20, 2023

Related U.S. Application Data

(60) Provisional application No. 63/253,842, filed on Oct. 8, 2021.

(51) Int. Cl.
*H04N 21/438* (2011.01)
*H04H 20/78* (2008.01)
*H04N 21/236* (2011.01)
*H04N 21/414* (2011.01)

(52) U.S. Cl.
CPC ....... *H04N 21/4383* (2013.01); *H04N 21/236* (2013.01); *H04N 21/41407* (2013.01); *H04H 20/78* (2013.01)

(58) Field of Classification Search
CPC ............. H04N 21/4383; H04N 21/236; H04N 21/41407; H04N 21/2221; H04N 21/2383; H04N 21/6168; H04N 21/6118; H04H 20/78; H04B 10/25751; H04L 12/2801

See application file for complete search history.

(56) References Cited

U.S. PATENT DOCUMENTS

2025/0125987 A1* 4/2025 Kien ................... H04L 12/2801

OTHER PUBLICATIONS

"The First Step in Cable Network Transformation: Digitization", Cisco 2019, 10 pages.

* cited by examiner

*Primary Examiner* — Diane D Mizrahi
(74) *Attorney, Agent, or Firm* — Grossman Tucker Perreault & Pfleger, PLLC; Norman S. Kinsella

(57) ABSTRACT

A broadband digital access (BDA) architecture includes a BDA hub device in a headend/hub and one or more BDA node modules in one or more HFC nodes to enable digital communications between the headend/hub and the HFC node(s) in a CATV/HFC network. The BDA hub device and the BDA node module(s) are connected by one or more downstream optical fibers and one or more upstream optical fibers to enable digital optical communications therebetween. The BDA hub device provides an analog RF interface with equipment in the headend/hub and the BDA node module provides an analog RF interface with subscriber locations via one or more coaxial cables.

17 Claims, 11 Drawing Sheets

BROADBAND DIGITAL ACCESS (BDA) ARCHITECTURE FOR EXTENDING DIGITAL BROADBAND COMMUNICATIONS IN AN HFC NETWORK

TECHNICAL FIELD

The present disclosure relates generally to hybrid fiber-coaxial (HFC) networks, and more particularly, to a broadband digital access (BDA) architecture for extending digital broadband communications in an HFC network, such as a CATV network.

BACKGROUND INFORMATION

Hybrid fiber-coaxial (HFC) networks are commonly used for broadband communications such as CATV communications in a CATV network in accordance with the Data Over Cable Service Interface Specification (DOCSIS). In a CATV/HFC network, HFC optical nodes are used to provide the optical/electrical conversion between the fiber and coaxial cable portions of the network. In particular, the HFC optical nodes include circuitry for converting downstream optical signals to RF electrical signals for transmission over coaxial cables to subscriber locations and for converting upstream RF electrical signals to upstream optical signals for transmission over optical fiber to a headend/hub. In some HFC networks, the downstream and upstream optical signals transmitted between the headend/hub and the HFC optical nodes are analog signals. To improve performance, other HFC networks have implemented digital data transmission between the headend/hub and HFC nodes, which reduces signal to noise ratio (SNR), enables higher-order modulation schemes to deliver more bandwidth, and allows the HFC nodes to be moved closer to the subscriber locations.

Although providing digital fiber connections and communication between the headend/hub and subscriber locations in a CATV/HFC network enables higher bandwidth communications, converting existing CATV/HFC networks to implement such digital communications presents challenges. In particular, the infrastructure changes (e.g., replacing HFC nodes) required to implement such digital fiber connections may be expensive and may require significant network downtime.

SUMMARY

Consistent with an aspect of the present disclosure, a broadband digital access (BDA) architecture provides digital broadband communications between a headend/hub and at least one optical node coupled to the headend/hub with optical fibers in a hybrid fiber-coaxial (HFC) network. The BDA architecture includes a BDA hub device for use in the headend/hub and at least one BDA node module for use in the at least one optical node. The BDA hub device is configured to convert at least one hub downstream analog RF signal from the headend/hub to a downstream digital optical signal transmitted over a downstream optical fiber and configured to convert an upstream digital optical signal received from an upstream optical fiber to at least one hub upstream analog RF signal for the headend/hub. The at least one BDA node module is configured to be coupled to the BDA hub device via the downstream optical fiber and the upstream optical fiber. The BDA node module is configured to convert the downstream digital optical signal received from the downstream optical fiber to at least one node downstream analog RF signal transmitted over a plurality of coaxial cables and configured to convert a plurality of node upstream analog RF signals received from respective ones of the plurality of coaxial cables to the upstream digital optical signal for transmission over the upstream optical fiber.

Consistent with another aspect of the present disclosure, a broadband digital access (BDA) hub device is provided for use in a headend/hub in an HFC network. The BDA hub device includes at least one hub device downstream RF port configured to receive at least one hub downstream analog RF signal at the headend/hub and a plurality of hub device upstream RF ports associated with each of at least one BDA node module located in at least one optical node of the HFC network and configured to provide at least one hub upstream analog RF signal at the headend/hub. The BDA hub device also includes a hub device conversion stage configured to provide analog-to-digital (A/D) conversion between the at least one hub downstream analog RF signal and at least one hub downstream digital RF signal and configured to provide digital-to-analog (D/A) conversion between at least one hub upstream digital RF signal and the at least one hub upstream analog RF signal. The BDA hub device further includes at least one hub device optical transceiver configured to convert the downstream digital RF signal to a downstream digital optical signal for transmission over a downstream optical fiber and configured to convert an upstream digital optical signal received from an upstream optical fiber to the at least one upstream analog RF signal. Hub device control circuitry is configured to control operation of the at least one hub device optical transceiver and the hub device conversion stage.

Consistent with a further aspect of the present disclosure, a broadband digital access (BDA) node module is provided for use in a hybrid fiber-coaxial (HFC) optical node in an HFC network. The BDA node module includes at least one node module downstream RF port configured to provide at least one node downstream RF analog signal for transmission over a plurality of coaxial cables and a plurality of node module upstream RF ports configured to receive a plurality of node upstream RF analog signals from respective ones of the plurality of coaxial cables. The BDA node module also includes a node module conversion stage configured to provide digital-to-analog (D/A) conversion between at least one node downstream digital RF signal and the at least one node downstream analog RF signal and to provide analog-to-digital (A/D) conversion between the plurality of node upstream analog RF signals and a plurality of node upstream digital RF signals. The BDA node module further includes at least one node module optical transceiver configured to convert a downstream digital optical signal received over a downstream optical fiber to the node downstream digital RF signal and configured to convert the plurality of node upstream digital RF signals to an upstream digital optical signal for transmission over an upstream optical fiber. Node module control circuitry is configured to control operation of the at least one node module optical transceiver and the node module conversion stage.

BRIEF DESCRIPTION OF THE DRAWINGS

These and other features and advantages will be better understood by reading the following detailed description, taken together with the drawings wherein.

DETAILED DESCRIPTION

Figure 1:
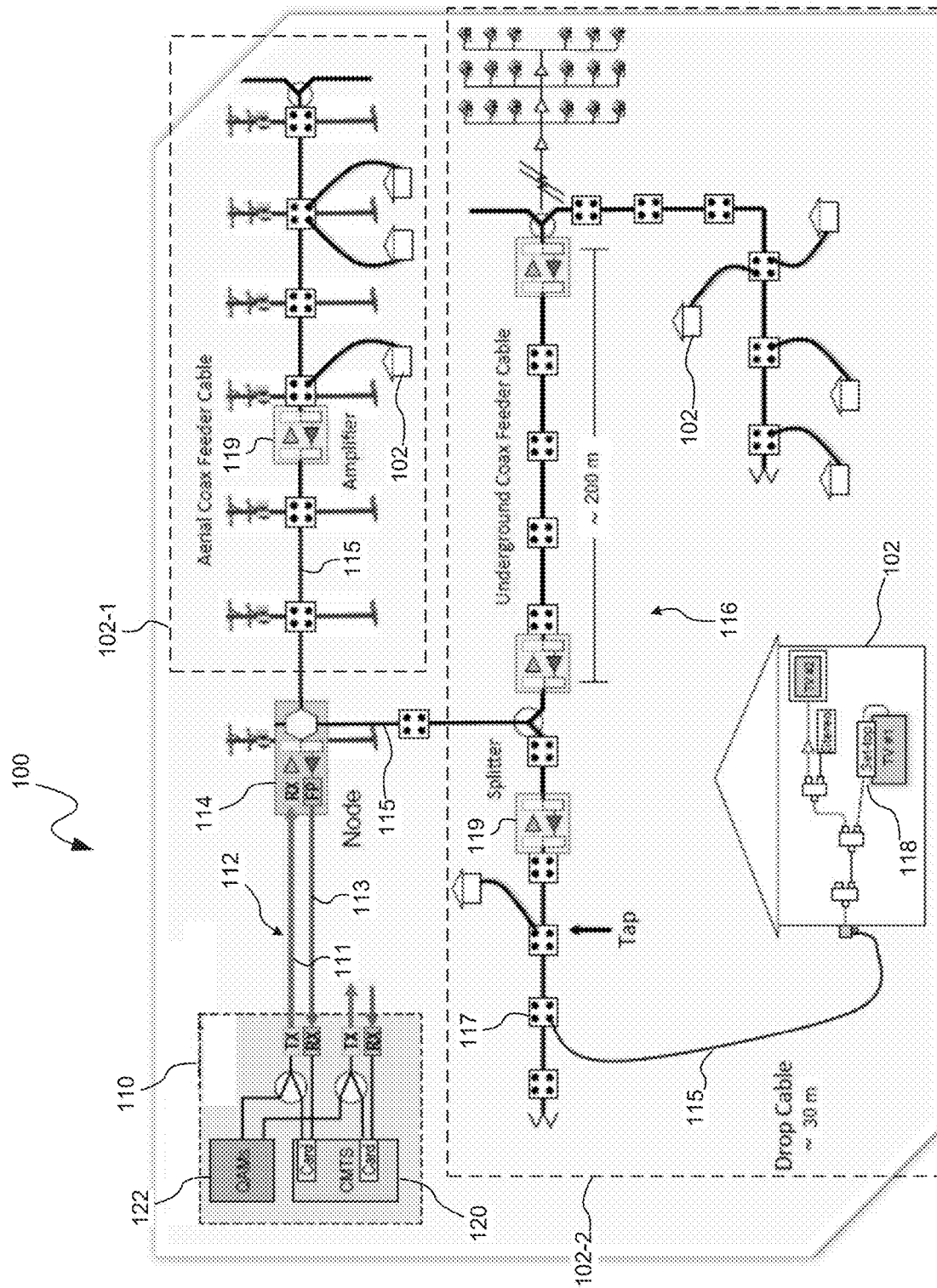
FIG. 1 is a schematic diagram of an example CATV/HFC network in which a broadband digital access (BDA) architecture may be implemented, consistent with embodiments of the present disclosure.

A broadband digital access (BDA) architecture, consistent with embodiments of the present disclosure, includes a BDA hub device in a headend/hub and one or more BDA node modules in one or more HFC optical nodes to enable digital communications between the headend/hub and the HFC node(s) in a CATV/HFC network. The BDA hub device and the BDA node module(s) are connected by one or more downstream optical fibers and one or more upstream optical fibers to enable digital optical communications therebetween. The BDA hub device provides an analog RF interface with equipment in the headend/hub and the BDA node module provides an analog RF interface with subscriber locations via one or more coaxial cables.

Providing digital communications between the headend/hub and the HFC node(s) enables an increase in bandwidth, as compared to analog communications that may be limited to a modulation depth of 256QAM. Using the BDA architecture as described herein also allows the digital communications to be implemented with improvements over other digital solutions. One such solution is a digital access architecture (DAA) that deploys remote PHY devices (RPDs) closer to the customers and replaces analog transmitters and receivers with digital fiber connections. Implementing this type of DAA solution requires significant changes in the field, such as replacing an existing HFC optical node with a remote PHY node. The remote PHY node enables a packet-based link (e.g., using Ethernet) over the optical cables to the headend/hub. Using an RPD or remote PHY node also tends to consume a significant amount of power in order to implement packet-based communication, such as Ethernet. While Ethernet provides reliable and robust connectivity and error handling, such operations are power-consuming and thus heat generating. Thus, implementing a DAA solution to achieve digital communication achieves higher bandwidth at the cost of significant modifications of the HFC network in the field, increased power consumption, and increased design complexity.

In contrast, the BDA architecture, consistent with embodiments of the present disclosure, is capable of achieving higher bandwidth without having to entirely replace existing HFC nodes. BDA node modules are designed for use in existing HFC nodes, and the BDA architecture may be implemented without having to use an RPD (i.e., the PHY may remain in the headend/hub). The BDA architecture can achieve higher bandwidth by using orthogonal frequency-division multiplexing (OFDM) with QAM 4096 and by achieving a higher modulation error ratio (MER) at the optical node (e.g., an MER in the mid 40s), which enables higher data throughput. Using the BDA node module in an existing HFC optical node, e.g., instead of an RPD, thus allows the higher bandwidth to be achieved with a lower power consumption.

As used herein, "module" is a structural term referring to a self-contained assembly of components (e.g., electronic, optical or opto-electronic components) that together perform a dedicated function. The "modules" discussed herein (e.g., BDA node module) are used as the names for structure and thus the term "module" is not being used as a nonce word in the present application. As used herein, the terms "circuit" and "circuitry" refer to physical electronic components (i.e., hardware) and any software and/or firmware (i.e., code), which may configure the hardware, be executed by the hardware, and/or otherwise be associated with the hardware. A particular processor and memory, for example, may comprise a first "circuit" when executing a first portion of code to perform a first function and may comprise a second "circuit" when executing a second portion of code to perform a second function. As used herein, the term "coupled" refers to any connection, coupling, link or the like between elements. Such "coupled" elements are not necessarily directly connected to one another and may be separated by intermediate components.

FIG. 1 shows an example HFC network 100 that may implement a BDA architecture, consistent with the present disclosure. In this embodiment, the HFC network 100 is a cable television (CATV) network that implements a Data Over Cable Service Interface Specification (DOCSIS) such as the DOCSIS 3.1 or 4.0 standard, or later standards that may be developed. A CATV network is capable of delivering both cable television programming (i.e., video) and IP data services (e.g., internet and voice over IP) to customers or subscribers 102 through the same fiber optic cables and coaxial cables (i.e., trunk lines). Such CATV/HFC networks are commonly used by service providers, such as Comcast Corporation, to provide combined video, voice and broadband internet services to the subscribers.

Multiple cable television channels and IP data services (e.g., broadband internet and voice over IP) may be delivered together simultaneously in the CATV/HFC network by transmitting signals using frequency division multiplexing over a plurality of physical channels across a CATV channel spectrum. One example of the CATV channel spectrum includes 158 channels (6 MHz wide) from 54 MHz to 1002 MHz, but the CATV channel spectrum may be expanded even further, for example, to 1218 MHz or 1794 MHz, to increase bandwidth for data transmission. In a CATV channel spectrum, some of the physical channels may be allocated for cable television channels and other physical channels may be allocated for IP data services. Other channel spectrums and bandwidths may also be used and are within the scope of the present disclosure. Other channel spectrums and bandwidths may also be used and are within the scope of the present disclosure.

In addition to the signals being carried downstream (also referred to as forward signals) to deliver the video and IP data to the subscribers, the CATV/HFC network may also carry signals (e.g., IP data or control signals) upstream from the subscribers 102 (also referred to as reverse signals), thereby providing bi-directional communication over the trunks. According to one example, the signal spectrum for the reverse signals carried upstream may be up to about 600 MHz.

The CATV/HFC network 100 also uses various modulation and transmission techniques for transmitting signals including the video and IP data. Analog cable television channels have been delivered by modulating RF carriers within the CATV channel spectrum using amplitude and frequency modulation and transmitting the modulated signals, for example, according to NTSC standards. An analog cable television channel typically corresponds to and occupies the full bandwidth (e.g., 6 MHZ) of a physical channel in the CATV channel spectrum. Digital cable television channels and IP data may be delivered by modulating RF carriers within the CATV channel spectrum, for example, using quadrature amplitude modulation (QAM). Using QAM to modulate digital data on RF carriers in the CATV spectrum results in an analog RF signal containing the digital data. A QAM-modulated analog RF signal may be in the form of an optical signal when carried over optical fibers and in the form of an electrical signal when carried over coaxial cables. The QAM-modulated RF carriers within the CATV channel spectrum used to carry digital video and IP data may be referred to as QAM channels, and multiple QAM channels (e.g., multiple digital cable television channels) may occupy the CATV channel spectrum. As delivery of video and IP data converges, CATV networks and transmission techniques have evolved such that video may also be delivered as IP data (e.g., video on demand), for example, according to DOCSIS standards.

The CATV/HFC network 100 generally includes a headend/hub 110 connected via optical fiber trunk lines 112 to one or more optical nodes 114, which are connected via a coaxial cable distribution network 116 to customer premises equipment (CPE) 118 at subscriber locations 102. The headend/hub 100 may be located in a brick-and-mortar building at a centralized location for a given region, city or town and is generally responsible for collecting, decoding, modulating, combining, and transmitting content and/or data.

The headend/hub 110 may include a cable modem termination system (CMTS) 120 to connect the CATV/HFC network 100 to a data network, such as the internet, and to handle all upstream and downstream IP data. The headend/hub 110 may also include QAM devices 122 (e.g., video QAM or edge QAM (EQAM)) that separately handle downstream video. In the illustrated embodiment, the headend/hub 110 receives, processes and combines the content (e.g., broadcast video, narrowcast video, and internet data) to be carried over the optical fiber trunk lines 112 as optical signals.

The optical fiber trunk lines 112 include forward path optical fibers 111 (also referred to as downstream optical fibers) for carrying downstream optical signals from the headend/hub 110 and return or reverse path optical fibers 113 (also referred to as upstream optical fibers) for carrying upstream optical signals to the headend/hub 110. The optical nodes 114 provide an optical-to-electrical interface between the optical fiber trunk lines 112 and the coaxial cable distribution network 116. The optical nodes 114 thus receive downstream optical signals and transmit upstream optical signals and transmit downstream (forward) RF electrical signals and receive upstream (reverse) RF electrical signals. The optical nodes 114 may include a weatherized housing (e.g., complying with Ingress Protection (IP) code 68) and may be mounted in a variety of outdoor locations such as on a pole, pedestal or other structure. The optical nodes 114 may also include one or more optical ports for connecting to the optical fiber trunk line 112 and a plurality of coaxial cable ports for connecting to a plurality of coaxial cables 115.

The cable distribution network 116 includes coaxial cables 115 including trunk coaxial cables connected to the optical nodes 114 and feeder coaxial cables connected to the trunk coaxial cables. Subscriber drop coaxial cables are connected to the distribution coaxial cables using taps 117 and are connected to customer premises equipment 118 at the subscriber locations 102. The customer premises equipment 118 may include set-top boxes for video and cable modems for data. One or more line extender RF amplifiers 119 may also be coupled to the coaxial cables 116 for amplifying the forward signals (e.g., CATV signals) being carried downstream to the subscribers 102 and for amplifying the reverse signals being carried upstream from the subscribers 102. The subscribers 102 may be grouped according to one or more service groups such as, for example, service groups 102-1, 102-2, and the number of service groups associated with an optical node 114 may be configured or changed using segmentation, as will be described in greater detail below.

The downstream optical signals carried on the forward path optical fiber 111 and the downstream RF electrical signals carried on the coaxial distribution network 116 include the video and downstream IP data being delivered to the subscribers 102 from the headend/hub 110. The upstream optical signals carried on the return path optical fibers 113 and the upstream RF electrical signals carried on the coaxial cables 116 may include upstream IP data and other subscriber data (e.g., control signals for ordering video content). In an analog HFC network, the downstream optical signals and upstream optical signals between the headend/hub 110 and the optical node 114 are analog optical signals (e.g., QAM-modulated on RF carriers in the CATV channel spectrum). To provide broadband digital access (BDA), consistent with the present disclosure, a BDA hub device may be provided in the headend/hub 110 and a BDA node module may be provided in the optical node 114, as will be described in greater detail below.

In this embodiment, the QAM devices 122 in the headend/hub 110 perform QAM modulation of digital data to generate downstream QAM-modulated analog RF signals with the video and data. The cable modem termination system (CMTS) 120 in the headend/hub 110 connects the CATV network 100 to a data network, such as the internet, and provides the MAC and PHY layer connection to cable modems 118 at the subscriber locations 102. The CMTS 120 may include a downstream PHY component including downstream PHY-related hardware (e.g., QAM modulators) and an upstream PHY component including upstream PHY-related hardware (e.g., QAM demodulators). The CMTS 120 may also provide other functions such as routing and MAC control and provisioning.

The CATV network 100 may be configured consistent with known standards such as, for example, the DOCSIS 3.1 Physical Layer Specification (CM-SP-PHYv.3.1-109-

160602). In one variation of the embodiment shown in FIG. 1, the CMTS 120 may handle all upstream and downstream IP data and a video QAM or edge QAM (EQAM) device 122 separately handles downstream video. In another variation of the embodiment shown in FIG. 1, the CMTS 120 may be a modular CMTS core in a modular headend architecture (MHA) and the downstream PHY component may be located in the EQAM device (not shown) in the headend/hub 110. In the MHA configuration, the EQAM device thus handles both downstream data and video and the modular CMTS core handles upstream data and provides the downstream data to the EQAM device over a downstream external PHY interface (DEPI). In a further variation of the embodiment shown in FIG. 1, the CMTS 120 may be an integrated CMTS or Converged Cable Access Platform (CCAP) that handles both data and video.

Figure 2:
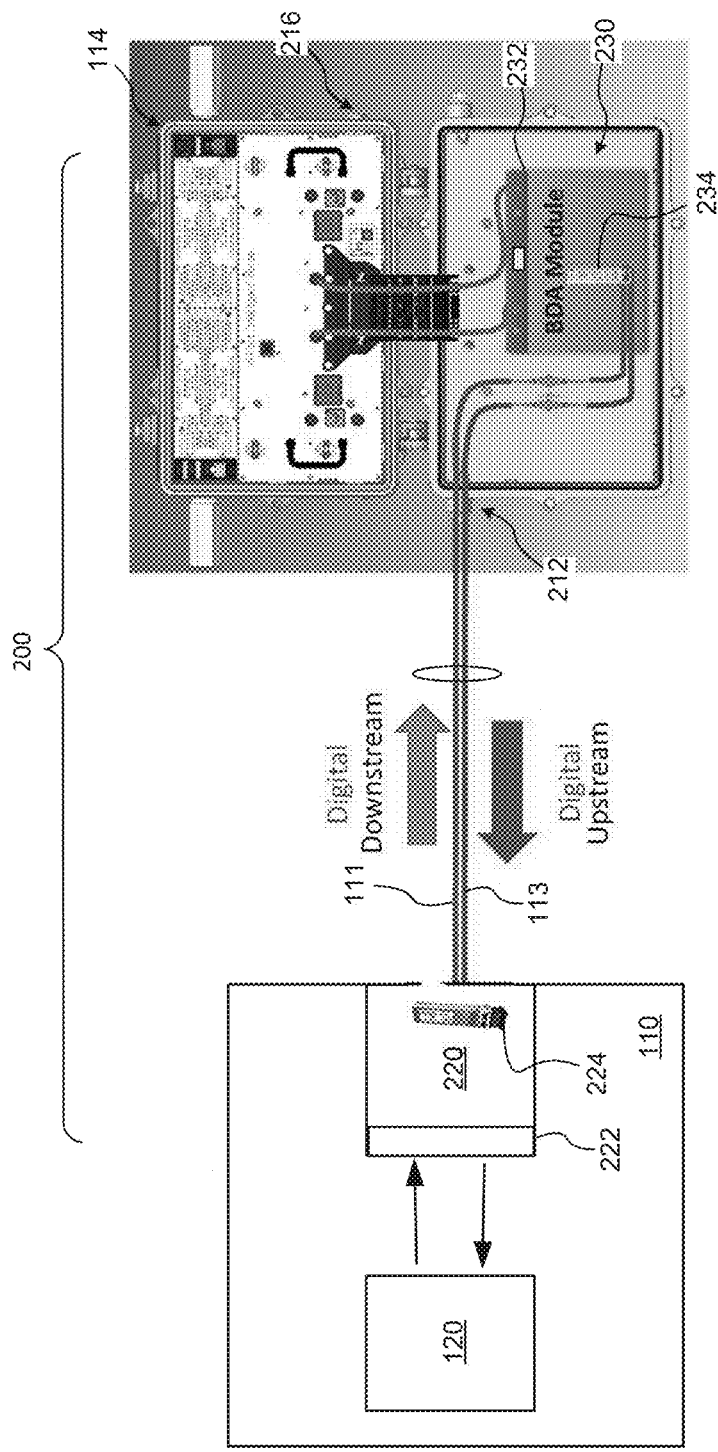
FIG. 2 is a schematic diagram of a BDA architecture, consistent with an embodiment of the present disclosure, for use in a CATV/HFC network.

Referring to FIG. 2, a BDA architecture 200, consistent with embodiments of the present disclosure, is shown and described in greater detail. The BDA architecture 200 includes a BDA hub device 220 in the headend/hub 110 and at least one BDA node module 230 in the HFC optical node 114. The BDA hub device 220 and the BDA node module 230 are optically coupled with one or more downstream optical fibers 111 and one or more upstream optical fibers 113, which may be less than twenty kilometers in length in some embodiments. In some embodiments, multiple optical nodes 114 and BDA node modules 230 may be coupled to one BDA hub device 220 with multiple pairs of optical fibers 111, 113.

The BDA hub device 220 may be implemented as a 2 RU (Rack Unit) shelf (also referred to as a BDA shelf) that may be installed in the headend/hub 110 and connected to the CMTS 120. The BDA hub device 220 includes a hub RF interface 222 for handling hub upstream and downstream RF analog signals to and from the CMTS 120, as will be described in greater detail below.

The BDA node module 230 may be designed as a module that fits into an existing HFC optical node 114. The optical node 114 may include a housing 214 with optical ports 212 on the housing 214 for connecting to the optical fibers 111, 113 and coaxial cable ports 216 for connecting to coaxial cables (e.g., coaxial cables 115). The BDA node module 230 is disposed in the existing housing 214 of the optical node 114 and coupled to the optical ports 212 and coaxial cable ports 216, for example, via fibers, wires and connectors. The BDA node module 230 includes a node RF interface 232 for transmitting the downstream analog RF signals to subscriber locations and for receiving the upstream analog RF signals via the coaxial cable ports 216 and the coaxial cables, as will be described in greater detail below.

The BDA hub device 220 includes one or more hub optical transceivers 224 and the BDA node module 230 includes one or more node optical transceivers 234 to provide bidirectional digital optical communication over the optical fibers 111, 113. As will be described in greater detail below, the BDA hub device 220 may include a plurality of hub optical transceivers 224 for optically connecting to a plurality of BDA node modules 230 and optically communicating, for example, using wavelength division multiplexing (WDM). The optical transceivers 222, 232 may use pulse amplitude modulation level 4 (PAM-4) technology and may achieve a bandwidth of at least 400 gigabits per second (Gb/s).

Figure 3:
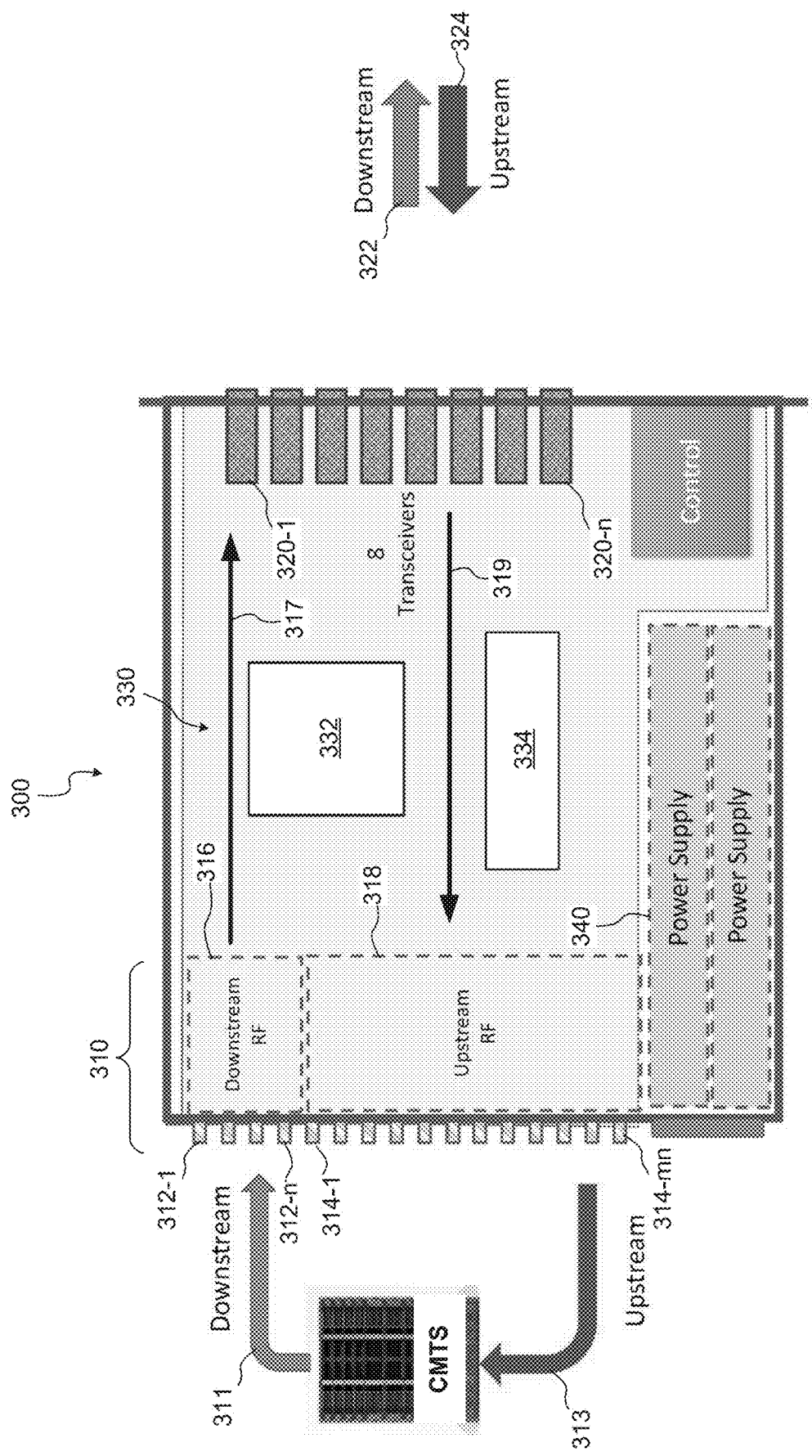
FIG. 3 is a schematic diagram of a BDA hub device, consistent with an embodiment of the present disclosure, for use in a headend/hub of a CATV/HFC network.

Referring to FIG. 3, an embodiment of a BDA hub device 300, consistent with the present disclosure, is shown and described in greater detail. As mentioned above, the BDA hub device 300 may be configured as a 2 RU shelf located in a headend/hub of a CATV/HFC network. In this embodiment, the BDA hub device 300 includes a hub RF interface 310, a plurality (n) of hub optical transceivers 320-1 to 320-$n$, hub device control circuitry 330, and a power supply 340. The hub RF interface 310 handles analog RF communications with equipment in the headend/hub, such as a CMTS, and the hub optical transceivers 320-1 to 320-$n$ handle optical digital communications with respective BDA node modules over optical fibers. The hub device control circuitry 330 controls the hub RF interface 310 and the hub optical transceivers 320-1 to 320-$n$ and controls the analog RF communications and the digital optical communications in the BDA hub device 300. The power supply 340 may receive power from an external power source and supply power to the components of the BDA hub device 300.

In the illustrated embodiment, the BDA hub device 300 includes eight (n=8) hub optical transceivers 320-1 to 320-$n$ for optically connecting to eight respective BDA node modules in eight respective HFC nodes over eight pairs of optical fibers (not shown). Other numbers of hub optical transceivers may also be used in other embodiments of the BDA hub device.

The hub RF interface 310 includes hub RF ports 312, 314 and a hub conversion stage 316, 318 for providing analog-to-digital and digital-to-analog conversion. In this embodiment, the hub RF interface 310 includes a plurality (n) of hub downstream RF ports 312-1 to 312-$n$ and a plurality (n*m) of hub upstream RF ports 314-1 to 314-$mn$, configured to be electrically connected to equipment in the headend/hub, such as a CMTS. Each of the hub downstream RF ports 312-1 to 312-$n$ are configured to receive a hub downstream RF analog signal 311 (e.g., from a CMTS in the headend/hub) and each of the hub upstream RF ports 314-1 to 314-$mn$ are configured to provide a hub upstream RF analog signal 313 (e.g., to a CMTS in the headend/hub). Each of the hub optical transceivers 320-1 to 320-$n$ may be associated with a respective one of the downstream RF ports 312-1 to 312-$n$ and a respective group of the upstream RF ports 314-1 to 312-$nm$.

To allow upstream segmentation in a BDA node module at an optical node to support a plurality (m) of service groups, the upstream RF ports 314-1 to 314-$nm$ include n groups of m RF ports, where m is the number of possible service groups supported by a BDA node module. Each of the hub optical transceivers 320-1 to 320-$n$ is thus associated with one of the n groups of m upstream RF ports from the plurality of upstream ports 314-1 to 314-$mn$. The upstream segmentation configured in the BDA node module will determine which of the m upstream RF ports associated with that BDA node module are used. In the illustrated embodiment of the BDA hub device 300, the hub RF interface 310 includes at least eight (8) downstream RF ports 312-1 to 312-$n$ and at least eight (8) groups of upstream RF ports 312-1 to 312-$mn$ associated with the respective eight optical transceivers 320-1 to 320-$n$.

Figure 4A:
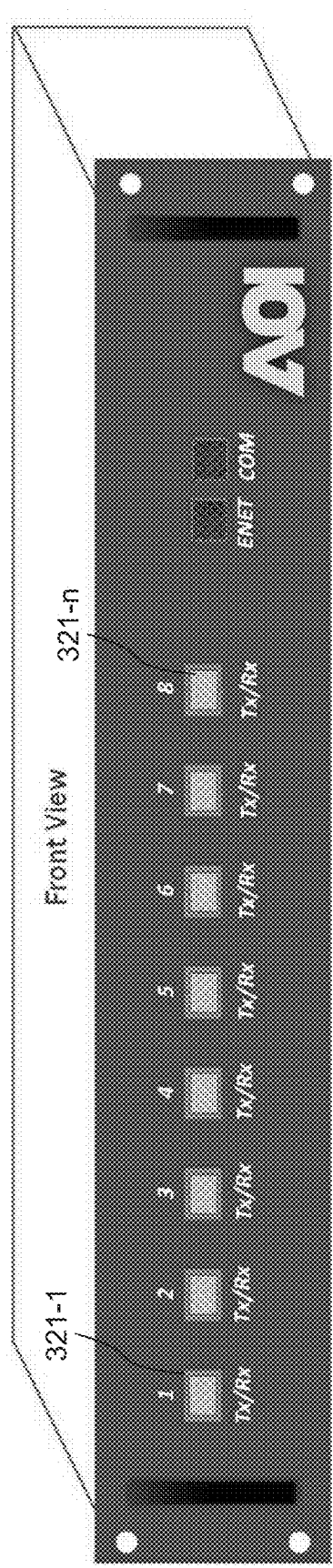
FIGS. 4A and 4B are front and rear views of an embodiment of the BDA hub device, consistent with the present disclosure, including RF ports and optical ports.
Figure 4B:
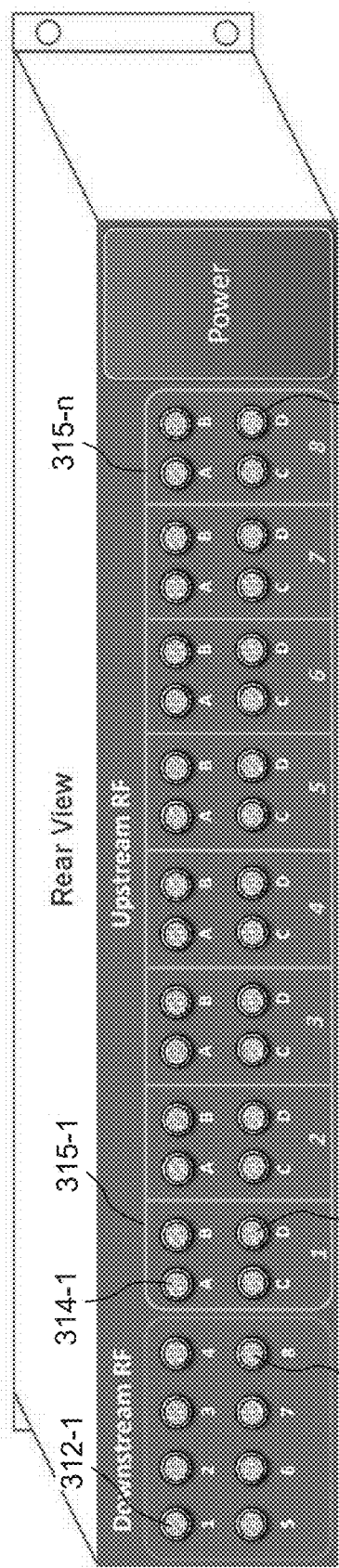

Referring to FIGS. 4A and 4B, an example of the optical interface and RF interface of the BDA hub device 300 is shown and described in greater detail. As shown in FIG. 4A, in this embodiment, the hub optical interface of the BDA hub device 300 includes eight (n=8) optical transceiver connections 321-1 to 321-$n$, corresponding to eight hub optical transceivers 320-1 to 320-$n$ (not shown in FIG. 4A), for connecting to eight respective optical fiber connectors, such as LC connectors. As shown in FIG. 4B, in this embodiment, the hub RF interface includes eight (n=8) hub downstream RF ports 312-1 to 312-$n$ associated with the eight optical transceiver connections 321-1 to 321-$n$ and eight (n=8) groups 315-1 to 315-n of hub upstream RF ports 314-1 to 314-nm associated with the eight optical transceiver connections 321-1 to 321-n. In this embodiment, each of the eight groups 315-1 to 315-n includes four (m=4) hub upstream RF ports 314-1 to 314-m for a total of 32 (m=4× n=8) hub upstream RF ports 314-1 to 314-mn.

Each of the groups 315-1 to 315-n of hub upstream ports 314-1 to 314-mn may be associated with a BDA node module in an optical node, and the hub upstream RF ports 314-1 to 314-m (A, B, C, D) in each of the groups 315-1 to 315-n may be associated with one to four possible service groups handled by that BDA node module. The hub control circuitry 330 (shown in FIG. 3) may route the hub upstream RF signals to the appropriate hub upstream RF ports 314-1 to 314-m in each of the groups 315-1 to 315-n depending on the upstream service group segmentation, as will be described in greater detail below.

Although the illustrated embodiment shows eight (8) hub downstream RF ports with one associated with each of eight BDA node modules that may be connected to the BDA hub device 300, other embodiments may include more than one hub downstream RF port associated with each of the BDA node modules connected to the BDA hub. For example, if each of the BDA node modules is capable of handling two (2) downstream RF signals, a BDA hub device may include 16 hub downstream RF ports with two hub downstream RF ports associated with each of the connected BDA node modules.

Referring back to FIG. 3, the hub RF interface 310 also includes hub analog-to-digital (A/D) conversion circuitry 316 for converting the hub downstream analog RF signals 311 to hub downstream digital RF signals 317 and hub digital-to-analog (D/A) conversion circuitry 318 for converting hub upstream digital RF signals 319 to the hub upstream analog RF signals 313. The analog-to-digital conversion circuitry 316 and the hub digital-to-analog conversion circuitry 318 may include circuitry known to those of ordinary skill in the art for providing A/D and D/A conversion of RF signals.

The hub optical transceivers 320-1 to 320-n convert the hub downstream digital RF signals 317 to downstream digital optical signals 322 for transmission over respective downstream optical fibers to respective BDA node modules. In one example, each of the downstream digital optical signals 322 transmitted over a downstream optical fiber may be associated with one downstream service group and may use a downstream bandwidth of up to 960 MHz. The hub optical transceivers 320-1 to 320-n also receive upstream optical digital signals 324 from respective upstream optical fibers and convert the hub upstream digital optical signals 324 to the hub upstream digital RF signals 319. Where upstream segmentation has occurred in the BDA node module and the hub upstream optical signal 324 received by a hub optical transceiver includes a plurality of service group signals, the hub BDA device 300 demultiplexes the hub upstream digital RF signal from that hub optical transceiver to produce separate hub upstream digital RF signals for the respective service groups, which are routed to the appropriate hub upstream RF ports 314-1 to 314-nm associated with those service groups.

Each of the hub optical transceivers 320-1 to 320-n may include a quad small form factor pluggable (QSFP) transceiver that uses pulse amplitude modulation level 4 (PAM4) technology. In some embodiments, each of the hub optical transceivers 320-1 to 320-n operates at a wavelength of 1310 nm or 1550 nm. In other embodiments, each of the hub optical transceivers 320-1 to 320-n may operate at a different wavelength for wavelength division multiplexing of the downstream optical digital signals.

The hub control circuitry 330 controls operation of the hub A/D conversion circuitry 316 for converting the hub downstream analog RF signals 311 to hub downstream digital RF signals 317 and routes the hub downstream digital RF signals 317 to the hub optical transceivers 320-1 to 320-n. The hub control circuitry 330 also routes the hub upstream digital RF signals 319 from the hub optical transceivers 320-1 to 320-n to the hub D/A conversion circuitry 318 and controls the hub D/A conversion circuitry 318 for converting the hub upstream digital RF signals 319 to upstream analog RF signals 313. Where upstream segmentation has occurred and the upstream digital optical signal includes signals from a plurality of service groups, the hub control circuitry 330 may also control demultiplexing of the corresponding hub upstream digital RF signal 319 into a plurality of hub upstream digital RF signals corresponding to the plurality of service groups.

In this embodiment, the hub device control circuitry 330 includes special purpose logic circuitry 332, such as a field programmable gate array (FPGA) or an application specific integrated circuit (ASIC), and a microprocessor 334. The microprocessor 334 may include memory to store data for routing the RF signals in the BDA hub device 300. For example, the memory may store data associating downstream and upstream RF ports with each of the hub optical transceivers 320-1 to 320-n and associating hub upstream RF ports 314-1 to 314-nm with service groups. When one or more hub upstream RF digital signals 319 are provided by one of the hub optical transceivers, for example, the control circuitry 330 determines which of one or more of the hub upstream RF ports 314-1 to 314-mn is associated with the hub upstream RF digital signal(s) 319 and routes the hub upstream RF signal(s) 319 to the appropriate hub upstream RF port(s) 314-1 to 314-mn. For example, a lookup table stored in memory may include entries that associate hub upstream RF ports 314-1 to 314-mn with optical nodes and/or service groups in a CATV/HFC network.

Figure 5:
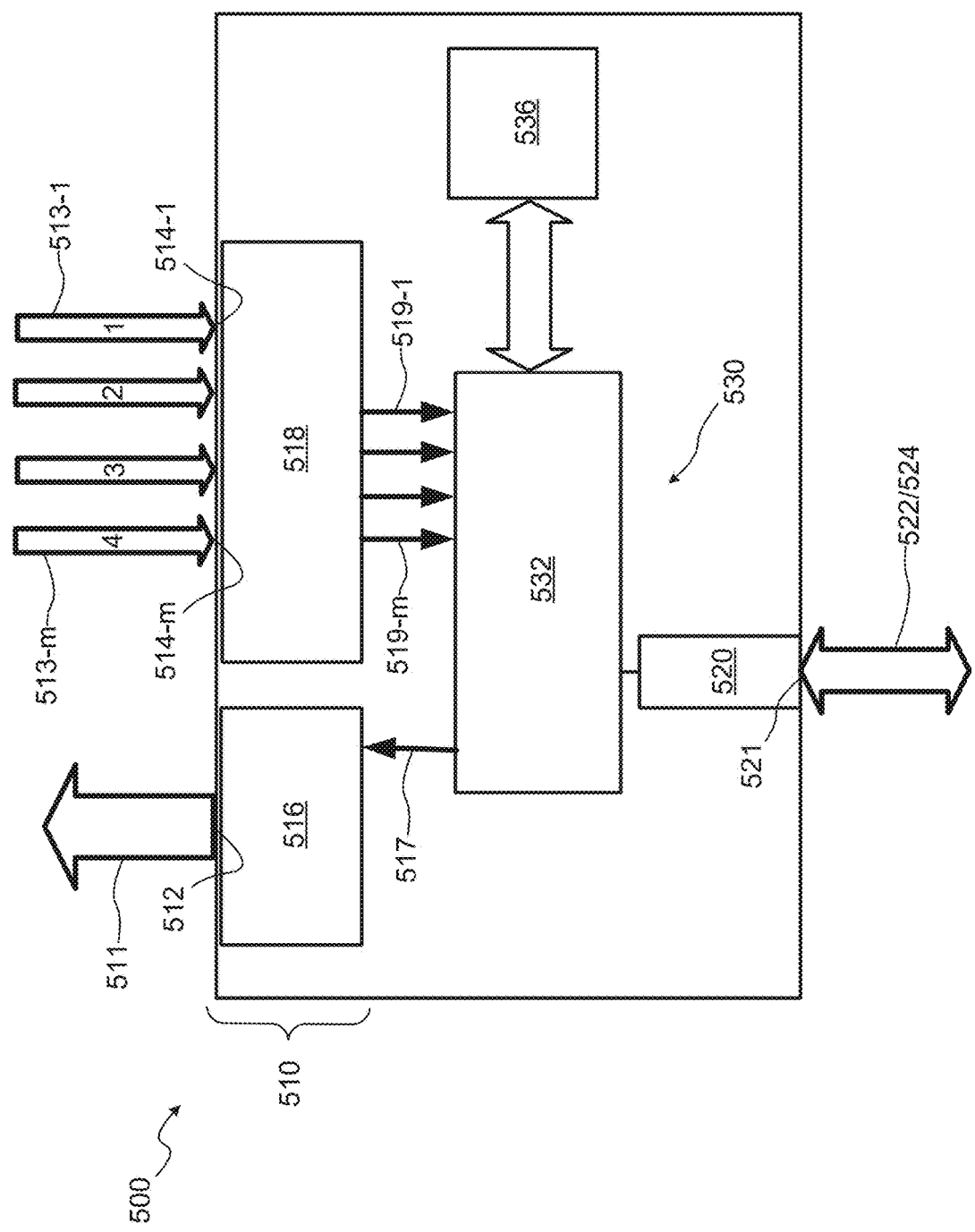
FIG. 5 is a schematic diagram of a BDA node module, consistent with an embodiment of the present disclosure, for use in an optical node of a CATV/HFC network.

Referring to FIG. 5, an embodiment of a BDA node module 500, consistent with the present disclosure, is shown and described in greater detail. As mentioned above, the BDA node module 500 may be located in an existing HFC optical node of a CATV/HFC network and optically connected to one of the hub optical transceivers (e.g., one of the transceivers 320-1 to 320-n) via a pair of optical fibers. In this embodiment, the BDA node module 500 includes a node RF interface 510, at least one node optical transceiver 520, and node module control circuitry 530. The node RF interface 510 handles analog RF communications with the subscriber equipment, such as cable modems, over coaxial cables, and the node optical transceiver 520 handles optical digital communications with a respective one of the optical transceivers in the BDA hub device. The node module control circuitry 530 controls the node RF interface 510 and the node optical transceiver(s) 520 and controls the analog RF communication and the digital optical communications in the BDA node module 500. The BDA node module 500 may be configured to be connected to a power supply in the HFC optical node.

The node RF interface 510 includes node RF ports 512, 514 and a node conversion stage 516, 518 for providing analog-to-digital (A/D) and digital-to-analog (D/A) conversion. In this embodiment, the node RF interface 510 includes at least one node downstream RF port 512 and a plurality of node upstream RF ports 514-1 to 514-m. The node upstream RF ports 514-1 to 514-m are configured to be electrically connected to respective coaxial cable ports in the HFC optical node and the node downstream RF port 512 is configured to be electrically connected to multiple coaxial cable ports in the optical node. In the illustrated embodiment, the node RF interface 510 includes four (m=4) node upstream RF ports 514-1 to 514-m configured to be electrically connected to four coaxial cable ports on the HFC optical node. The BDA node module 500 thus allows node segmentation such that the node upstream RF ports 514-1 to 514-m may be configured to support one or more service groups (e.g., up to 4 service groups in the illustrated embodiment). By allowing node segmentation, the BDA node module 500 may be deployed initially in one HFC optical node for servicing a single service group sharing an upstream bandwidth and may be later segmented to service multiple smaller service groups that each share the same upstream bandwidth. As such, a smaller number of subscriber devices (e.g., cable modems) may share the upstream bandwidth, effectively increasing the upstream bandwidth available to the subscribers in the smaller service groups.

The node RF interface 510 also includes node module digital-to-analog (D/A) conversion circuitry 516 for converting the node downstream digital RF signal 517 to a node downstream analog RF signal 511 and node module analog-to-digital (A/D) conversion circuitry 518 for converting node upstream analog RF signals 513-1 to 513-m to the node upstream digital RF signals 519-1 to 519-m. The node module digital-to-analog conversion circuitry 516 and the node module analog-to-digital conversion circuitry 518 may include circuitry known to those of ordinary skill in the art for providing A/D and D/A conversion of RF signals. The node upstream digital RF signals 519-1 to 519-m associated with different service groups may be multiplexed in the BDA node module 500, for example, using time division multiplexing (TDM), into a multiplexed upstream digital RF signal.

The node module optical transceiver 520 converts the downstream digital optical signal 522 received from a downstream optical fiber to the node downstream digital RF signal 517. The node module optical transceiver 520 also converts a multiplexed upstream digital RF signal to the upstream digital optical signal 524 for transmission over an upstream optical fiber. The node module optical transceiver 520 may include a quad small form factor pluggable (QSFP) transceiver that uses pulse amplitude modulation 4-level (PAM4).

The node module control circuitry 530 controls operation of the node optical transceiver 520 for converting the downstream digital optical signals 522 to the downstream digital RF signal 517 and controls the D/A circuitry 516 for converting the downstream digital RF signal 517 to a downstream analog RF signal for transmission to the subscribers over coaxial cables. The node module control circuitry 530 controls operation of A/D conversion circuitry 518 for converting the upstream analog RF signals 513-1 to 513-m to upstream digital RF signals 519-1 to 519-m. Where segmentation has occurred and the upstream digital RF signals 519-1 to 519-m are associated with multiple service groups, the node module control circuitry 530 also controls multiplexing of the upstream digital RF signals 519-1 to 519-m, for example, using time division multiplexing (TDM), to provide a multiplexed upstream digital RF signal to the node module optical transceiver 520. The node module control circuitry 530 then controls operation of the node optical transceiver 520 for converting the multiplexed upstream digital RF signal to the upstream digital optical signal 524.

In this embodiment, the node module control circuitry 530 includes special purpose logic circuitry 532, such as a field programmable gate array (FPGA) or an application specific integrated circuit (ASIC). The node module control circuitry 530 may also include control plane logic 536 to control routing of upstream digital RF signals 519-1 to 519-m. The node module control circuitry 530 may further include a programmable processor, such as a microprocessor, executing software and a memory for storing data. The memory may be implemented as volatile, e.g., random access memory (RAM), and/or non-volatile memory, e.g., FLASH memory. The control circuitry may also be configured to execute one or more processes as described herein using other hardware, software, or any combination thereof.

The node module control circuitry 530 may determine if and how the upstream digital RF signals 519-1 to 519-m should be multiplexed based on an upstream segmentation configuration. For example, a lookup table may be stored in memory and may include entries associating the upstream RF ports 514-1 to 514-m with one or more service groups based on the desired upstream segmentation. The BDA node module 500 may be initially configured such that the upstream RF ports 514-1 to 514-m are associated with one service group and may allow reconfiguration to provide the upstream segmentation to support multiple service groups.

In some embodiments, the upstream segmentation may be configured remotely or virtually from the headend/hub, for example, using a provisioning message. The provisioning message may, for example, update the lookup table in memory in the BDA node module to change the upstream segmentation configuration. The provisioning message may be generated via a Simple Network Management Protocol (SNMP) using a management information base (MIB) application/browser. In one example, the provisioning command may be received via the optical connection between the BDA hub device and the BDA node module. The provisioning command may also be received via other communication links such as wirelessly via a modem (not shown), or via a local data link that can use nearfield communication (NFC), low-power Bluetooth, or simply a fixed/wired connection such as a USB cable connected from a technician's laptop to the BDA node module.

Figure 6A:
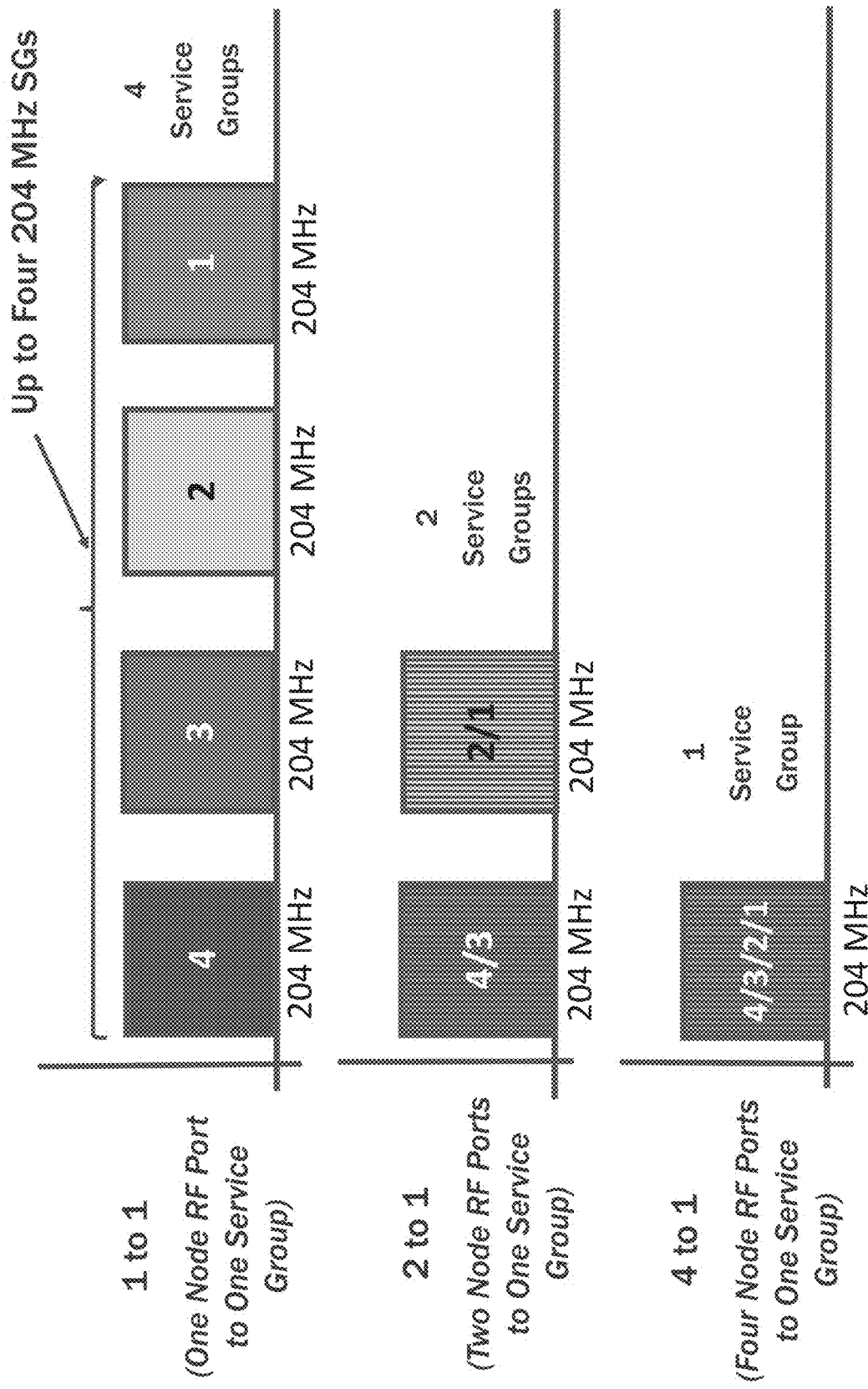
FIGS. 6A-6D show example logical representations of upstream port segmentation for a plurality of different service groups in accordance with aspects of the present disclosure.
Figure 6B:
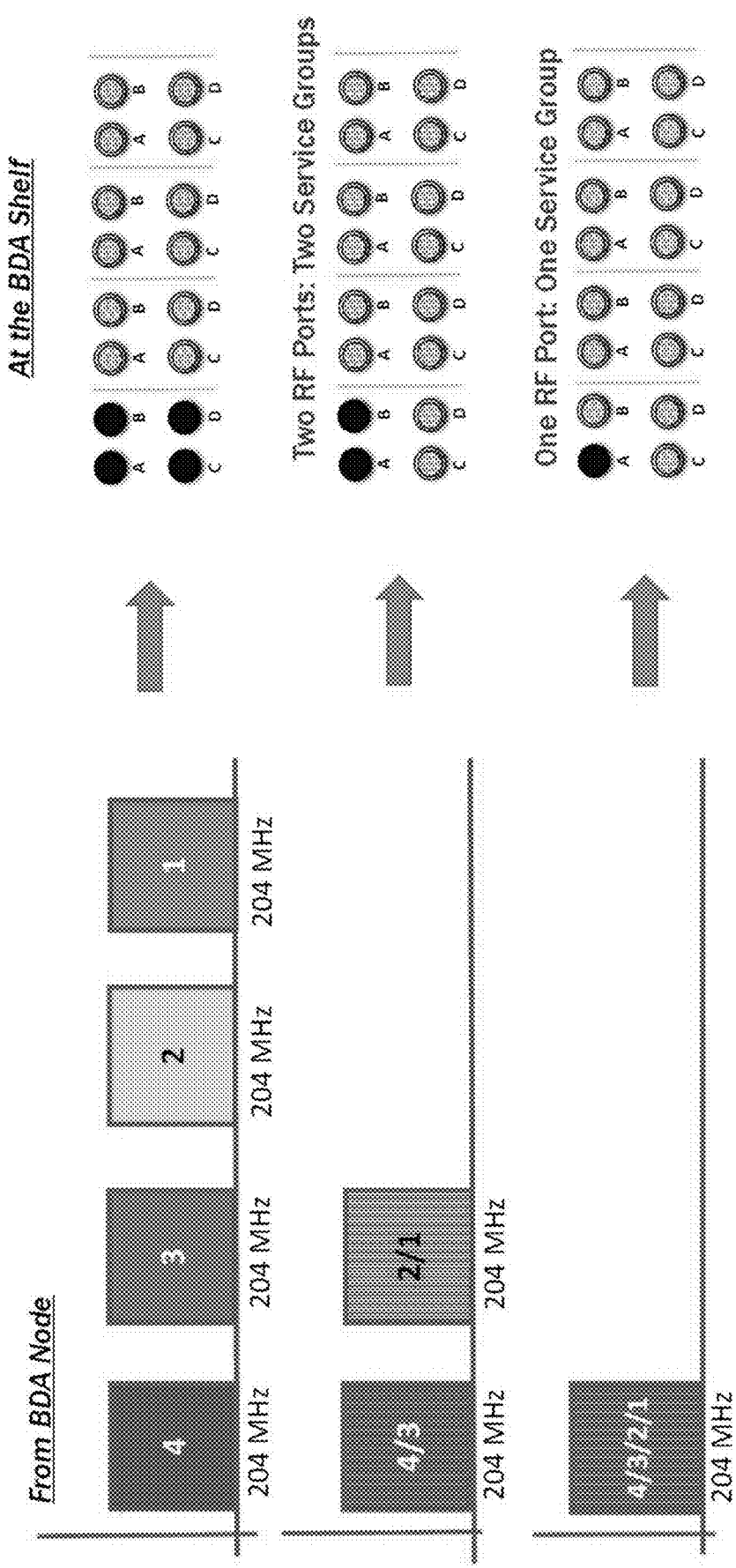
Figure 6D:
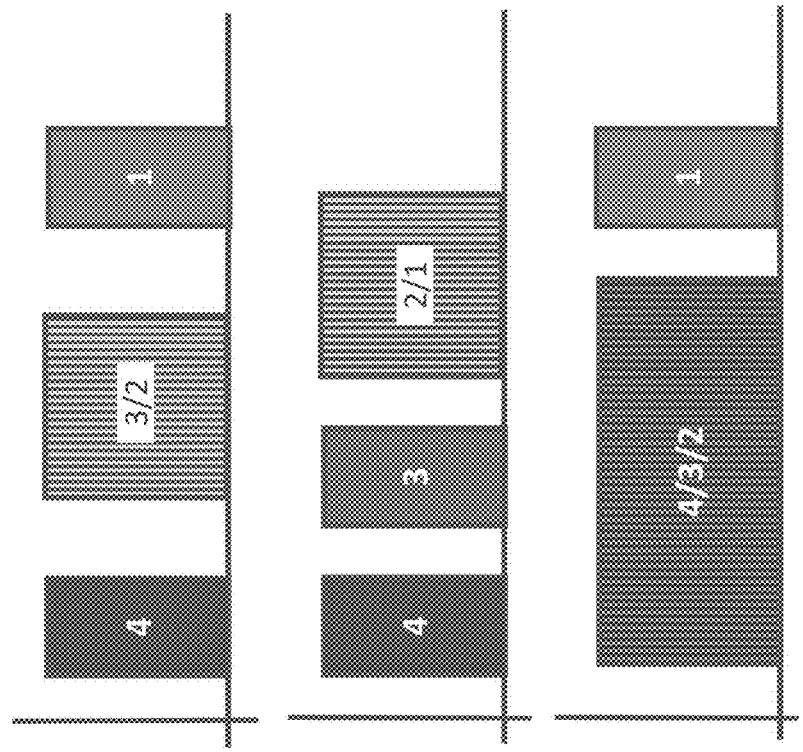
Figure 6C:
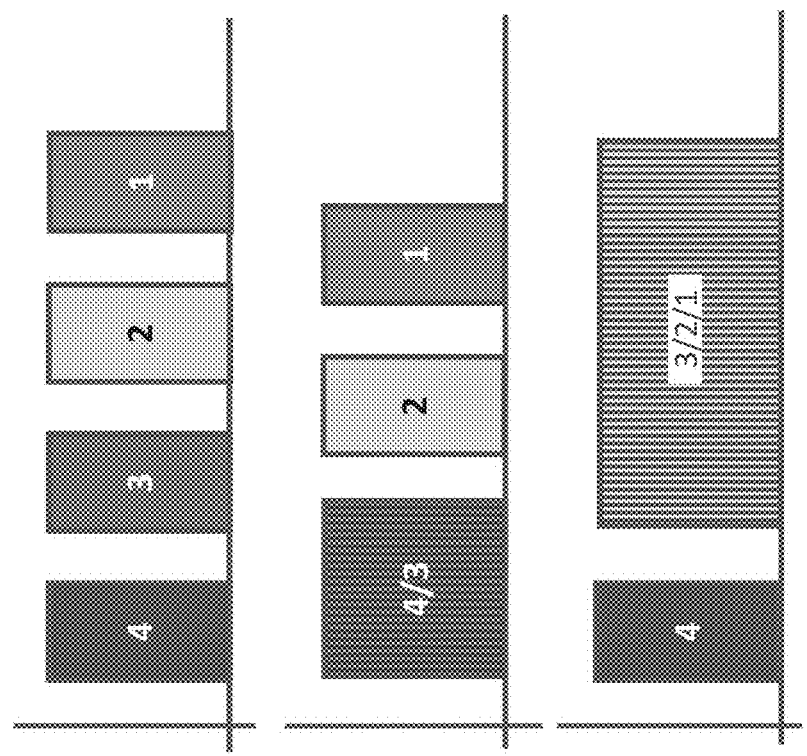

Referring to FIGS. 6A-6C, node segmentation in a BDA module, consistent with embodiments of the present disclosure, is described in greater detail. Where a BDA node module has m RF ports corresponding to m node ports, the BDA node module may be configured to support one to m service groups. As shown in FIG. 6A where there are 4 RF ports on the BDA module corresponding to 4 node ports, for example, a four-to-one configuration supports one service group (i.e., 4 node RF ports to one service group), a two-to-one configuration supports two service groups (i.e., two node RF ports to one service group) and a one-to-one configuration supports four service groups (i.e., four node RF ports to one service group). In one example where the upstream bandwidth is 204 MHZ, the four-to-one configuration requires all of the subscribers in the one service group to share the 204 MHz bandwidth (e.g., using frequency division multiplexing) and the one-to-one configuration allows each of the four service groups to use the 204 MHz bandwidth. Thus, segmentation allows more service groups with fewer subscribers sharing the same bandwidth, effectively increasing the potential upstream bandwidth for the subscribers.

As shown in FIG. 6B, the hub upstream RF ports in the BDA hub device are configured based on the upstream segmentation configuration. If a BDA node module is configured to provide a four-to-one configuration with an upstream RF signal for one service group, the hub upstream RF signal for that service group will be routed to one hub upstream RF port associated with that BDA node module. If a BDA node module is configured to provide a two-to-one configuration with upstream RF signals for two service groups, the hub upstream RF signals for those two service groups will be routed to two hub upstream RF ports associated with that BDA node module. If a BDA node module is configured to provide a one-to-one configuration with upstream RF signals for four service groups, the hub upstream RF signals for those four service groups will be routed to four hub upstream RF ports associated with that BDA node module.

As shown in FIGS. 6C and 6D, other upstream segmentation configurations are possible. For example, some node RF ports may be configured in a one-to-one configuration and other node RF ports may be configured in a two-to-one or three-to-one configuration.

Figure 7:
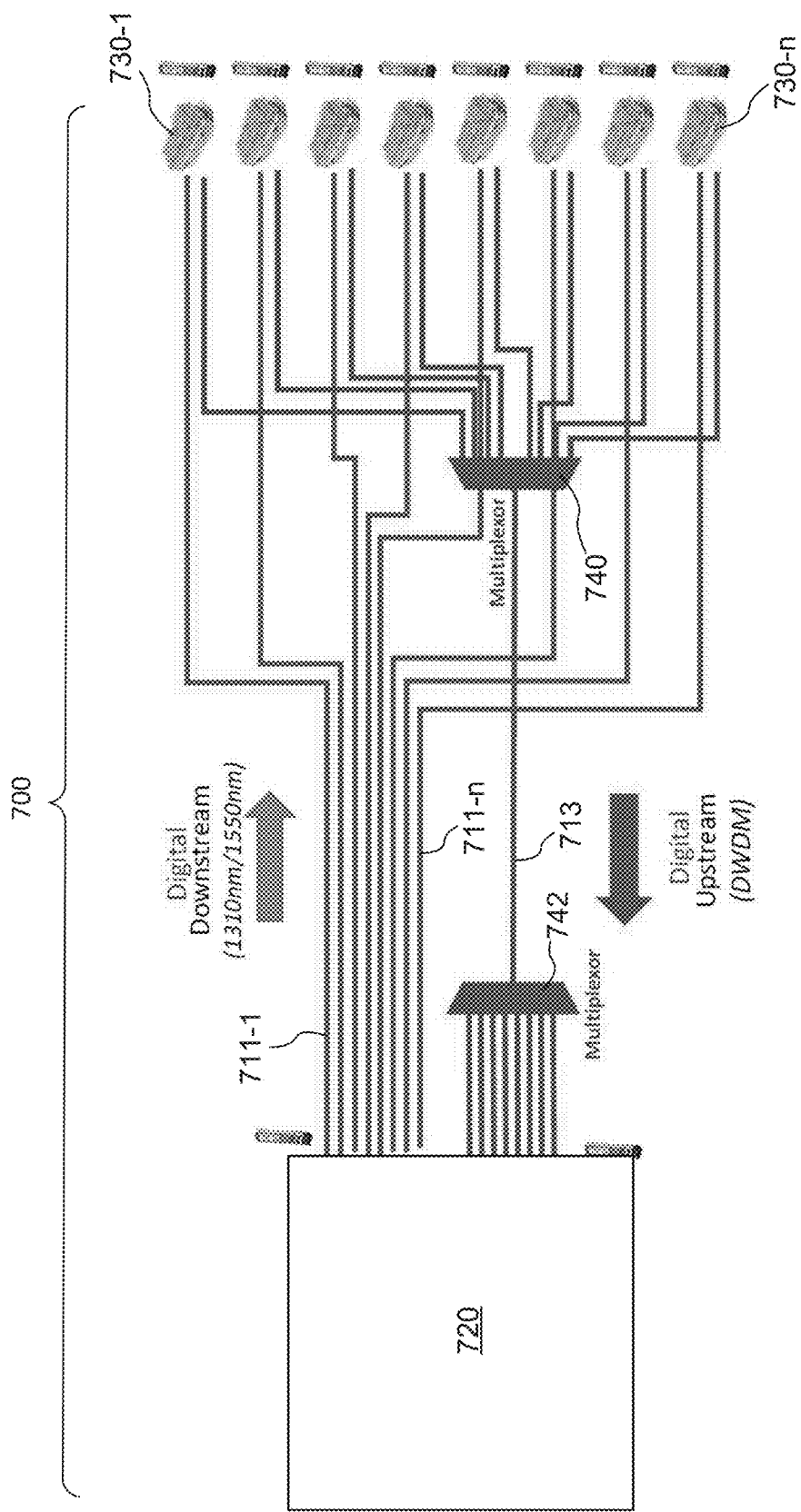
FIG. 7 is a schematic block diagram of BDA architecture including a BDA hub device optically coupled to a plurality of optical nodes including BDA node modules, consistent with another embodiment of the present disclosure.
Figure 8:
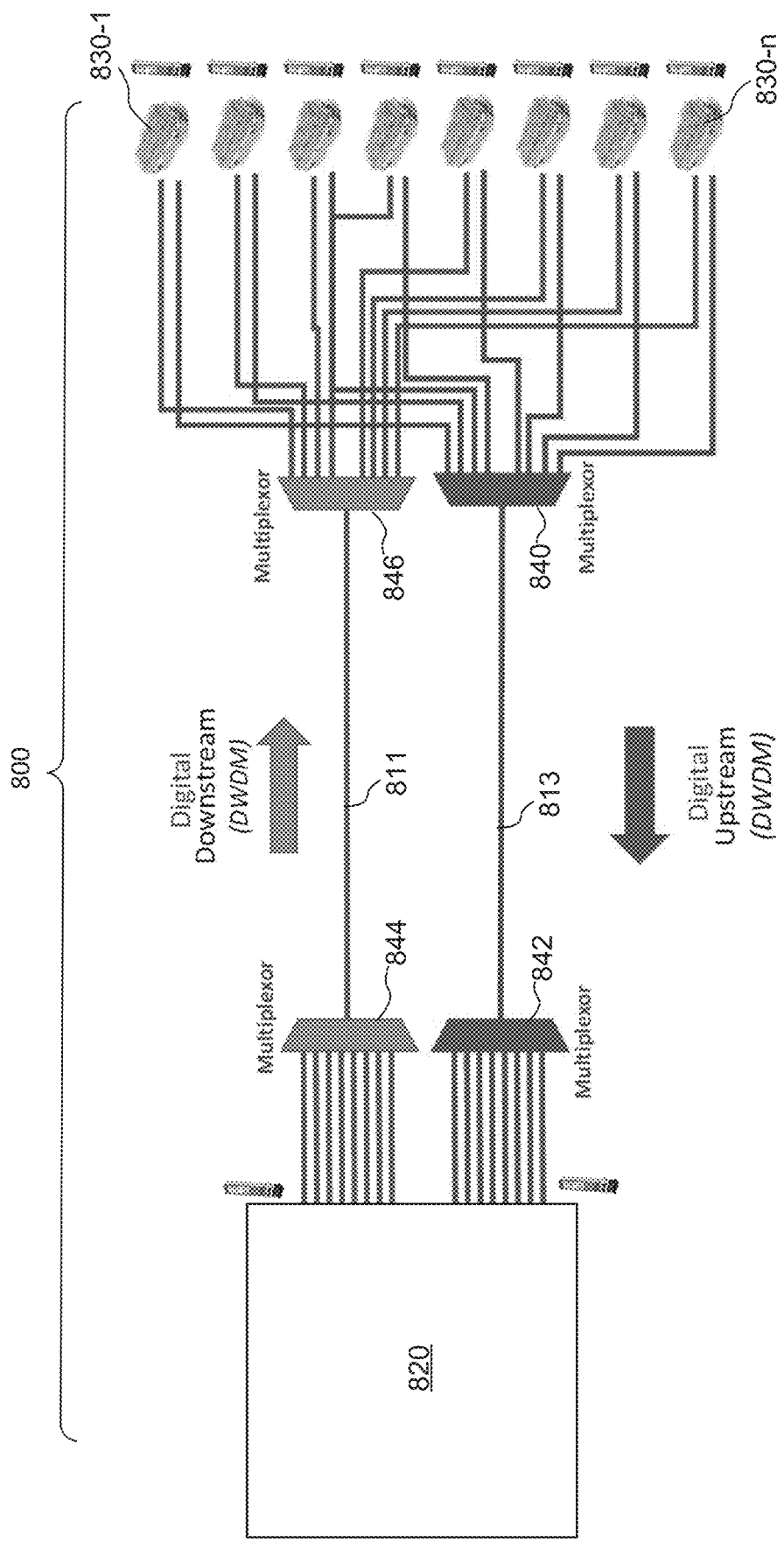
FIG. 8 is a schematic block diagram of BDA architecture including a BDA hub device optically coupled to a plurality of optical nodes including BDA node modules, consistent with a further embodiment of the present disclosure.
Figure 9:
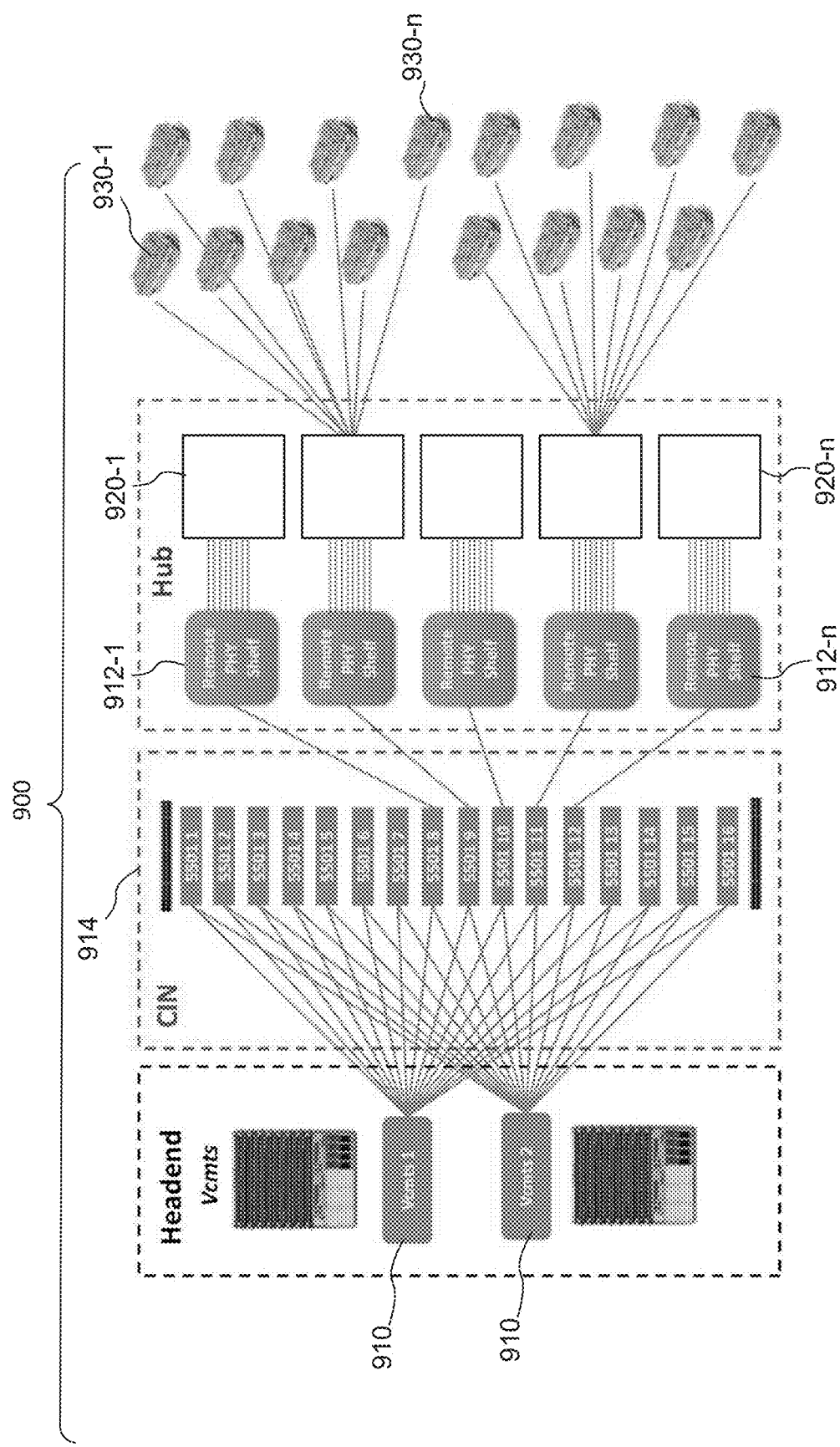
FIG. 9 is a schematic block diagram of BDA architecture including a plurality of BDA hub devices each optically coupled to a plurality of optical nodes including BDA node modules, consistent with yet another embodiment of the present disclosure.

Referring to FIGS. 7-9, different embodiments of a BDA architecture including a plurality of BDA node modules coupled to a BDA hub device are shown and described. Where a plurality of BDA node modules are coupled to a single BDA hub device, wavelength division multiplexing may be used.

As shown in FIG. 7, one embodiment of a BDA architecture 700 includes a BDA hub device 720 coupled to a plurality of optical nodes 730-1 to 730-n including BDA node modules, as described above, with separate downstream optical fibers 711-1 to 711-n providing downstream digital optical signals at a wavelength such as 1310 nm or 1550 nm. In this embodiment, the upstream digital optical signals are multiplexed using dense wavelength division multiplexing (DWDM) and sent over a single upstream optical fiber 713. For example, the BDA architecture 700 includes an upstream optical multiplexer 740 optically coupled to the node module transceivers in the optical nodes 730-1 to 730-n and an upstream optical demultiplexer 742 optically coupled to the hub optical transceivers in the BDA hub device 720. The upstream digital optical signals from the optical nodes 730-1 to 730-n are multiplexed, sent over a single upstream optical fiber 713 optically coupled between the upstream optical multiplexer 740 and demultiplexer 742, and then demultiplexed before being received by the hub optical transceivers in the BDA hub device 720.

As shown in FIG. 8, another embodiment of a BDA architecture 800 includes a BDA hub device 820 coupled to a plurality of optical nodes 830-1 to 830-n including BDA node modules using dense wavelength division multiplexing for both downstream and upstream optical communications. In addition to an upstream optical multiplexer 840 coupled to the node module transceivers in the optical nodes 830-1 to 830-n and an upstream optical demultiplexer 842 optically coupled to the hub optical transceivers in the BDA hub device 820, in this embodiment, the BDA architecture 800 includes a downstream optical multiplexer 844 optically coupled to the hub optical transceivers in the BDA hub device 820 and a downstream optical demultiplexer 846 optically coupled to the BDA node modules 830-1 to 830-n. The downstream digital optical signals are multiplexed, sent over a single downstream optical fiber 811 optically coupled between the downstream optical multiplexer 844 and demultiplexer 846, and then demultiplexed before being received by the node module optical transceivers in the optical nodes 830-1 to 830-n. The upstream digital optical signals are multiplexed, sent over a singe upstream optical fiber 813 optically coupled between the upstream optical multiplexer 840 and demultiplexer 842, and then demultiplexed before being received by the hub optical transceivers in the BDA hub device 820.

As shown in FIG. 9, a further embodiment of a BDA architecture 900 is used with a virtual cable modem termination systems (vCMTS) 910 to provide up to 1.8 GHz bandwidth. In this embodiment, a plurality of BDA hub devices 920-1 to 920-n are coupled to remote PHY devices 912-1 to 912-n in the hub and each of the BDA hub devices 920-1 to 920-n are optically coupled to a plurality of optical nodes 930-1 to 930-n including BDA node modules. The remote PHY devices 912-1 to 912-n are coupled to the vCMTS 910 in the headend via a converged interconnected network (CIN) 914.

Accordingly, a BDA architecture, consistent with embodiments of the present disclosure, allows a CATV/HFC network to be expanded and upgraded to higher bandwidths by providing an all digital link between a BDA hub device in a headend/hub and a BDA node module in an optical node. The BDA architecture may be implemented in existing CATV/HFC networks by leveraging the same fibers used for analog links and may also leverage existing HFC optical nodes, thereby avoiding the need to replace the entire optical node, for example, with a remote PHY node that requires more power consumption and generates more heat. The BDA architecture may eliminate the analog optics used in current analog optical distribution between a headend/hub and optical node. The BDA architecture may also eliminate the need for upgrading the cable plant to an IP based CIN network, which has significant operational and cost impacts, although the BDA architecture may be used together with a CIN in some embodiments to further expand bandwidth.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A broadband digital access (BDA) architecture for providing digital broadband communications between a headend/hub and at least one optical node coupled to the headend/hub with optical fibers in a hybrid fiber-coaxial (HFC) network, the BDA architecture comprising:

a BDA hub device for use in the headend/hub, the BDA hub device being configured to convert at least one hub downstream analog radio frequency (RF) signal from the headend/hub to a downstream digital optical signal transmitted over a downstream optical fiber and configured to convert an upstream digital optical signal received from an upstream optical fiber to at least one hub upstream analog radio frequency (RF) signal for the headend/hub; and at least one BDA node module for use in the at least one optical node and configured to be coupled to the BDA hub device via the downstream optical fiber and the upstream optical fiber, the BDA node module being configured to convert the downstream digital optical signal received from the downstream optical fiber to at least one node downstream analog radio frequency (RF) signal transmitted over a plurality of coaxial cables and configured to convert a plurality of node upstream analog radio frequency (RF) signals received from respective ones of the plurality of coaxial cables to the upstream digital optical signal for transmission over the upstream optical fiber.

2. The BDA architecture of claim 1 wherein the BDA node module is configured to provide upstream segmentation such that the plurality of node upstream analog radio frequency (RF) signals are associated with one or more upstream service groups, and wherein the BDA hub device is configured to provide the at least one hub upstream analog radio frequency (RF) signal corresponding the one or more upstream service groups.

3. The BDA architecture of claim 2 wherein the BDA node module is configured to provide upstream segmentation such that the plurality of node upstream analog radio frequency (RF) signals are received from a respective plurality of upstream service groups, and wherein the BDA hub device is configured to provide a plurality of hub upstream analog radio frequency (RF) signals corresponding to the plurality of upstream service groups.

4. The BDA architecture of claim 2 wherein the BDA node module is configured to provide upstream segmentation such that the plurality of node upstream analog radio frequency (RF) signals are received from one upstream service group, and wherein the BDA hub device is configured to provide one upstream analog radio frequency (RF) signal corresponding to the one upstream service group.

5. The BDA architecture of claim 1 wherein the BDA hub device comprises:
at least one hub device downstream radio frequency (RF) port configured to receive the at least one hub downstream analog RF signal at the headend/hub;
a plurality of hub device upstream radio frequency (RF) ports associated with each of the at least one BDA node module and configured to provide the at least one hub upstream analog RF signal at the headend/hub;
a hub device conversion stage configured to provide analog-to-digital (A/D) conversion between the at least one hub downstream analog radio frequency (RF) signal and at least one hub downstream digital radio frequency (RF) signal and configured to provide digital-to-analog (D/A) conversion between at least one hub upstream digital radio frequency (RF) signal and the at least one hub upstream analog radio frequency (RF) signal;
at least one hub device optical transceiver configured to convert the downstream digital radio frequency (RF) signal to the downstream digital optical signal for transmission over the downstream optical fiber and configured to convert the upstream digital optical signal received from the upstream optical fiber to the at least one upstream analog radio frequency (RF) signal; and
hub device control circuitry configured to control operation of the at least one hub device optical transceiver and the hub device conversion stage.

6. The BDA architecture of claim 5 wherein the plurality of hub device upstream radio frequency (RF) ports include four hub device upstream radio frequency (RF) ports associated with each of the at least one BDA node module, and wherein the at least one BDA node module is configured to convert four node upstream analog radio frequency (RF) signals to the upstream digital optical signal.

7. The BDA architecture of claim 6 wherein the at least one hub device downstream radio frequency (RF) port includes two hub device downstream radio frequency (RF) ports.

8. The BDA architecture of claim 5 wherein the at least one BDA node module includes a plurality of BDA node modules, wherein the at least one hub device optical transceiver includes a plurality of hub device optical transceivers associated with each of the plurality of BDA node modules.

9. The BDA architecture of claim 5 wherein the at least one BDA node module includes eight BDA node modules, wherein the at least one hub device optical transceiver includes eight hub device optical transceivers associated with respective ones of the eight BDA node modules.

10. The BDA architecture of claim 8 further comprising:
an upstream optical multiplexer and an upstream optical demultiplexer optically coupled between the plurality of BDA node modules and the plurality of hub device optical transceivers in the BDA hub device to provide dense wavelength division multiplexing (DWDM) of a plurality of upstream digital optical signals.

11. The BDA architecture of claim 10 further comprising:
a downstream optical multiplexer and a downstream optical demultiplexer optically coupled between the plurality of BDA node modules and the plurality of hub device optical transceivers in the BDA hub device to provide dense wavelength division multiplexing (DWDM) of a plurality of downstream digital optical signals.

12. The BDA architecture of claim 1 wherein the BDA node module comprises:
at least one node module downstream radio frequency (RF) port configured to provide the at least one node downstream radio frequency (RF) analog signal for transmission over the plurality of coaxial cables;
a plurality of node module upstream radio frequency (RF) ports configured to receive the plurality of node upstream radio frequency (RF) analog signals from respective ones of the plurality of coaxial cables;
a node module conversion stage configured to provide digital-to-analog (D/A) conversion between at least one node downstream digital radio frequency (RF) signal and the at least one node downstream analog radio frequency (RF) signal and to provide analog-to-digital (A/D) conversion between the plurality of node upstream analog radio frequency (RF) signals and the plurality of node upstream digital radio frequency (RF) signals;
at least one node module optical transceiver configured to convert the downstream digital optical signal received over the downstream optical fiber to the node downstream digital radio frequency (RF) signal and configured to convert the plurality of node upstream digital radio frequency (RF) signals to the upstream digital optical signal for transmission over the upstream optical fiber; and
node module control circuitry configured to control operation of the at least one node module optical transceiver and the node module conversion stage.

13. The BDA architecture of claim 12 wherein the plurality of node module upstream radio frequency (RF) ports includes four node module upstream ports.

14. The BDA architecture of claim 12 wherein the node module control circuitry is configured to control upstream segmentation in the BDA node module such that the node module upstream radio frequency (RF) ports are associated with one or more service groups.

15. The BDA architecture of claim 14 wherein the node module control circuitry is configured to control upstream segmentation in the BDA node module such that each of the plurality of node module upstream radio frequency (RF) ports is associated with a respective one of a plurality of service groups.

16. The BDA architecture of claim 14 wherein the node module control circuitry is configured to control upstream segmentation in the BDA node module such that the plurality of node module upstream radio frequency (RF) ports is associated with one service group.

17. The BDA architecture of claim 14 wherein the node module control circuitry is configured to be controlled remotely to control upstream segmentation in the BDA node module.

* * * * *